United States Patent [19]
Wagner et al.

[11] Patent Number: 6,000,922
[45] Date of Patent: Dec. 14, 1999

[54] MOLDING ASSEMBLY FOR PRODUCING MAGNETIC DEVELOPMENT ROLLERS HAVING PRECISE MAGNETIC DEVELOPMENT FIELDS

[75] Inventors: Jennifer R. Wagner; Moritz P. Wagner, both of Walworth, N.Y.

[73] Assignee: Xerox Corporation, Stamford, Conn.

[21] Appl. No.: 09/123,817

[22] Filed: Jul. 28, 1998

[51] Int. Cl.$^6$ ........................................................ B28B 17/00
[52] U.S. Cl. ........................ 425/3; 425/DIG. 33; 264/427
[58] Field of Search ................................ 425/3, DIG. 33; 264/427

[56] References Cited

U.S. PATENT DOCUMENTS

| | | | |
|---|---|---|---|
| 4,557,582 | 12/1985 | Kan et al. | 355/3 DD |
| 4,604,042 | 8/1986 | Tanigawa et al. | 425/3 |
| 5,019,796 | 5/1991 | Lee et al. | 335/302 |
| 5,181,971 | 1/1993 | Ohtsuka | 148/103 |

FOREIGN PATENT DOCUMENTS

| | | | |
|---|---|---|---|
| 62-257821 | 5/1986 | Japan | 425/3 |

*Primary Examiner*—Robert Davis
*Assistant Examiner*—Thukhanh T. Nguyen
*Attorney, Agent, or Firm*—Tallam I. Nguti

[57] ABSTRACT

A molding assembly for producing a magnetic development roller having relatively precise magnetic development fields for use in an electrostatographic reproduction machine to develop a latent image recorded on a photoconductive member of the machine. The molding assembly includes a cylindrical member having a first end, a second end, a first radius, and a shell portion. The shell portion includes an outer surface, and an inner surface defining a molding cavity that has a second radius corresponding to an outer radius of a magnetic development roller molded within the molding cavity. The molding assembly also includes a plurality of circumferentially spaced channels formed within the shell portion, with each channel of the plurality having generally parallel walls, and being located immediately adjacent the inner surface of the shell portion for containing a permanent magnet suitable for inducing a magnetic field in a magnetic development roller molded within the molding cavity. A permanent magnet is placed within each channel of the plurality of channels, and is spaced from each wall of the parallel walls of each channel. As placed, the permanent magnet defines an adjustment space therefor with each wall of the parallel walls. Importantly, the molding assembly includes an adjustment device for precisely adjusting a magnetizing position of the permanent magnet within the adjustment space. The adjustment device includes at least one pair of first members for adjustably moving the permanent magnet radially relative to a center of the molding cavity, and at least one pair of second members for translating the permanent magnet non-radially relative to a center of the molding cavity, thus efficiently adjusting the magnetizing position of the permanent magnet for inducing relatively precise magnetic development fields in a magnetic development roller molded within the molding cavity.

9 Claims, 5 Drawing Sheets

MOLDING ASSEMBLY FOR PRODUCING MAGNETIC DEVELOPMENT ROLLERS HAVING PRECISE MAGNETIC DEVELOPMENT FIELDS

RELATED APPLICATIONS

This Application is related to U.S. application Ser. No. 08/752,106 filed Nov. 20, 1996 and entitled a "Injected Molded Magnetic Roller Mold Cavity With Replaceable Inserts" and now U.S. Pat. No. 5,894,004.

BACKGROUND OF THE INVENTION

The present invention relates to electrostatographic image development using magnetic development rollers, and more specifically to a molding assembly for producing electrostatographic magnetic development rollers having precise magnetic development fields.

In the well-known process of electrostatographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a fine electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface.

The process as described above is useful for light lens copying from an original, or for printing electronically generated or stored originals such as with a raster output scanner (ROS), where a charged surface may be imagewise discharged in a variety of ways.

In the process of electrostatographic printing, the step of conveying toner to the latent image on the photoreceptor is known as "development." The object of effective development of a latent image on the photoreceptor is to convey changed toner particles to the latent image at a controlled rate so that the toner particles effectively adhere electrostatically to the image areas on the latent image.

A commonly used technique for development involves the use of a two-component developer material, which comprises, in addition to the toner particles, a quantity of magnetic development carrier granules or beads. The toner particles adhere triboelectrically to the relatively large carrier beads, which are typically made of steel. When the two-component developer material is placed in a magnetic development field, the carrier beads with the toner particles adhering thereto form what is known as a magnetic development brush, wherein the carrier beads form relatively long chains which resemble the fibers of a brush on a developer or development roller. The development roller is typically in the form of a cylindrical sleeve rotating around a fixed assembly of permanent magnets called a magnetic development roller. When the magnetic development brush is introduced into a development zone adjacent the photoreceptor, the electrostatic charge on the photoreceptor will cause the toner particles to be pulled off the carrier beads in the chain and onto the latent image.

Another known development technique involves a single-component developer, that is, a developer which consists entirely of toner. In a common type of single-component system, each toner particle has both an electrostatic charge (to enable the particles to adhere to the photoreceptor) and magnetic development properties (to allow the particles to be magnetic developmentally conveyed to the photoreceptor). Instead of using magnetic development carrier beads to form a magnetic development brush, the magnetized toner particles are caused to adhere directly to a magnetic development roller. In the development zone adjacent the photoreceptor, the electrostatic charge on the photoreceptor will cause the toner particles to be attracted from the magnetic development roller to the photoreceptor. Conventionally, magnetic development rollers each typically includes a plurality of poles for attracting the toner particles. These poles may be positioned on the periphery of the magnetic development roller at such positions to obtain optimum transfer of the toner particles to the photoconductive surface of the drum.

Magnetic development rollers have typically been manufactured with a core or body and magnets positioned on the periphery of the core. Typically the magnets are glued to the periphery of the core. The gluing of magnets to a core contributes to a series of problems. The gluing leads to positioning errors both radially and tangentially, reducing the quality of the roll. Further, added cost may be required to perform subsequent machining of the periphery of the roll to obtain needed accurate tolerances.

More recently, it has been known to mold magnetizable material about a shaft to form a magnetic development roller. The magnetizable material may be one of any suitable moldable materials but, preferably the materials include ferrite, or neodymium iron boron powder. Permanent magnets are imbedded in the molding assembly and are positioned near the periphery of the mold cavity of the assembly where the molded material is to be placed, in an attempt to transfer precise magnetic development fields from the permanent magnets to the magnetizable material within the mold cavity.

The following disclosures may be relevant to various aspects of the present invention. U.S. Pat. No. 5,181,971 discloses a method of manufacturing a magnetic development roller. The method includes the step of disposing a plurality of pairs of magnetic development poles each having the starting magnetic development pole and terminal magnetic development pole of a magnetic development line of force on the peripheral surface of a cavity in a metal mold in which a resin magnet is molded. The lines of flux are in parallel lines U.S. Pat. No. 5,019,796 discloses an improved bar magnet and method of construction and an improved magnetic development core. An assembly of magnet is shown for use in a processing station of a printing machine. The bar magnet is formed of permanent magnet material having magnetic development domains therein that are magnetized along epicyclical curve segments. The external magnetic development flux density is improved over that of a conventionally magnetized magnet.

U.S. Pat. No. 4,557,582 discloses a magnet roll including magnet pieces adhesively secured to a supporting shaft to increase the magnetic development flux density of a pole. The pieces are disposed so that they have repelling magnetic development forces in the interface between the piece behind the pole and the piece adjacent thereto.

The use of magnetizable material molded about a shaft however is plagued with several problems. Wear of the mold during the molding process, which is attributable to the abrasive nature of the ferrite material within the mold cavity magnets relative to the mold cavity, and which can change the radial positioning of the permanent magnets, thus affecting the strength of the magnetic development fields of a molded roller. Such wear is critical because the effective field of the permanent magnet is reduced as a cubic function of the distance between the permanent magnet and the molded material in the cavity, and because the portion of the mold between the molded material and the magnet must be kept to a minimum.

Further, the circumferential positions of the permanent magnets are critical because those of the poles within the molded magnetic development roller are critical for the proper transfer of the toner within the development unit of the printing machine. The circumferential positioning of the magnetic development fields of the permanent magnets can cause the fields to interact with each other within the mold, thus making it very difficult to predict where to place the permanent magnets within the mold around the mold cavity in order to obtain a magnetic development roller with poles positioned precisely in particular locations about its circumference.

Further, manufacturers may manufacture several different such rolls, rolls with poles in various positions, yet all these rolls must have the same length and diameter in order to fit a particular machine. Such differences in the positioning of the poles requires a separate expensive mold for each particular pole configuration, thus resulting in change-over costs when manufacturing rolls with identical diameters and different pole positions.

Attempts to position the permanent magnets precisely for desired radial and circumferential induced pole positioning, usually require that the positions of the permanent magnets be determined for example by using computer modeling. However, it has been found that even computer modeling is accurate only to approximately plus or minus one to three degrees. Therefore, further trial and error costly, as well as imprecise adjustments are often necessary following even such computer modeling.

There is therefore a need for an efficient, low cost molding assembly for producing electrostatographic magnetic development rollers that have precise magnetic development fields.

SUMMARY OF THE INVENTION

In accordance with the present invention, there is provided a molding assembly for producing a magnetic development roller having relatively precise magnetic development fields for use in an electrostatographic reproduction machine to develop a latent image recorded on a photoconductive member of the machine. The molding assembly includes a cylindrical member having a first end, a second end, a first radius, and a shell portion. The shell portion includes an outer surface, and an inner surface defining a molding cavity that has a second radius corresponding to an outer radius of a magnetic development roller molded within the molding cavity. The molding assembly also includes a plurality of circumferentially spaced channels formed within the shell portion, with each channel of the plurality having generally parallel walls, and being located immediately adjacent the inner surface of the shell portion for containing a permanent magnet suitable for inducing a magnetic field in a magnetic development roller molded within the molding cavity. A permanent magnet is placed within each channel of the plurality of channels, and is spaced from each wall of the parallel walls of each channel. As placed, the permanent magnet defines an adjustment space therefor with each wall of the parallel walls. Importantly, the molding assembly includes an adjustment device for precisely adjusting a magnetizing position of the permanent magnet within the adjustment space. The adjustment device includes at least one pair of first members for adjustably moving the permanent magnet radially relative to a center of the molding cavity, and at least one pair of second members for translating the permanent magnet non-radially relative to a center of the molding cavity, thus efficiently adjusting the magnetizing position of the permanent magnet for inducing relatively precise magnetic development fields in a magnetic development roller molded within the molding cavity.

BRIEF DESCRIPTION OF THE DRAWINGS

In the detailed description of the invention presented below, reference is made to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF A PREFERRED EMBODIMENT OF THE PRESENT INVENTION

Figure 1:
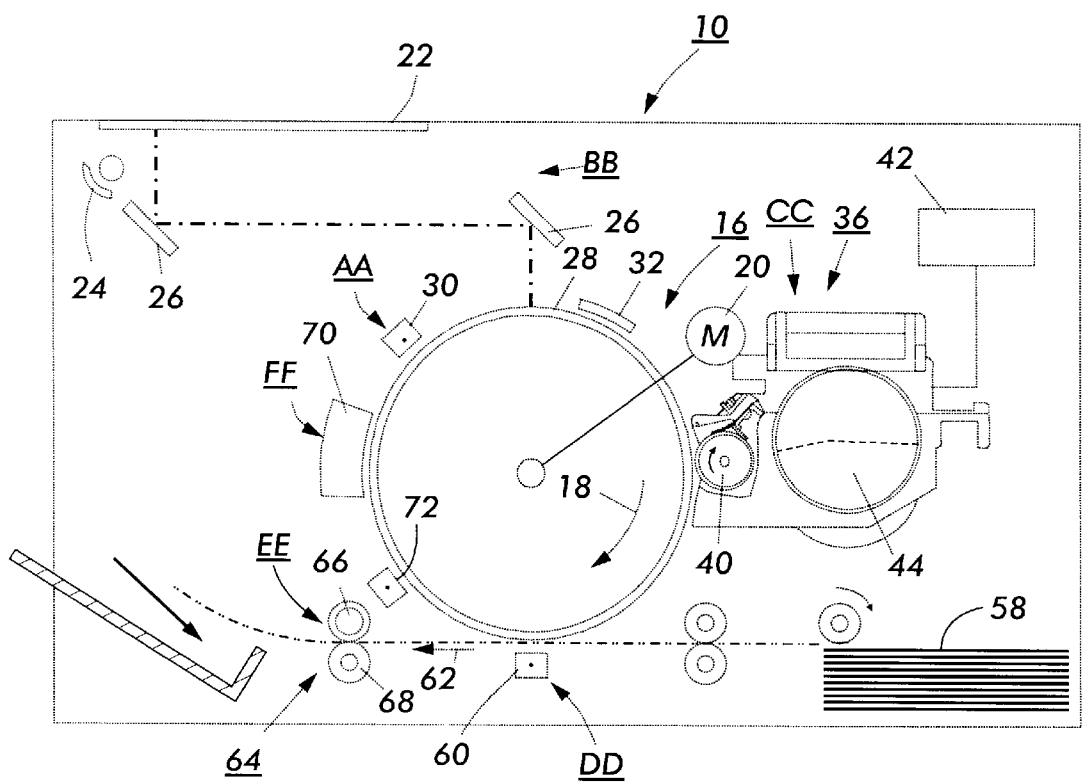
FIG. 1 is a schematic elevational view of an illustrative electrostatographic reproduction machine incorporating the magnetic development roller produced in accordance with the present invention.

For a general understanding of the illustrative electrostatographic reproduction machine incorporating the features of the present invention therein, reference is made to the drawings. In the drawings, like reference numerals have been used throughout to designate identical elements. FIG. 1 schematically depicts the various components of an electrostatographic reproduction machine, shown generally as 10, incorporating the developing device of the present invention therein. Although the developing device of the present invention is particularly well adapted for use in the illustrative printing machine, it will become evident that the developing device is equally well suited for use in a wide variety of printing machines and are not necessarily limited in its application to the particular embodiment shown herein.

Referring now to FIG. 1, the electrostatographic reproduction machine 10 as shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station AA. At charging station AA, a corona generating device, indicated generally by the reference numeral 30, charges the drum 16 to a selectively high uniform electrical potential, preferably negative. Any suitable control, well known in the art, may be employed for controlling the corona generating device 30.

A document to be reproduced is placed on a platen 22, located at imaging station BB, where it is illuminated in known manner by a light source such as a tungsten halogen lamp 24. The document thus exposed is imaged onto the drum 16 by a system of mirrors 26, as shown. The optical image selectively discharges surface 28 of the drum 16 in an image configuration whereby an electrostatic latent image 32 of the original document is recorded on the drum 16 at the imaging station BB.

At development station CC, a magnetic development system or unit, indicated generally by the reference numeral 36 advances developer is materials into contact with the electrostatic latent images. Preferably, the magnetic development developer unit includes a magnetic development roller 16 that is made in accordance with the present invention (to be described below) that is mounted in a housing. The magnetic development roller 16 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic development black toner, for example, particles 44 which are charged by the electrostatic field existing between the photoconductive surface and the electrically biased development roller in the developer unit. Power supply 42 electrically biases the development roller 16.

A sheet of support material 58 is moved into contact with the toner image at transfer station DD. The sheet of support material is advanced to transfer station DD by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station DD.

Transfer station DD includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station EE.

Fusing station EE includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the which operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device 72 to enable removal therefrom. These particles are removed at cleaning station FF. The vacuum assisted, electrostatic, brush cleaner unit 70 is disposed at the cleaner station FF. The cleaner unit has two brush rolls that rotate at relatively high speeds which creates mechanical forces that tend to sweep the residual toner particles into an air stream (provided by a vacuum source), and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrostatographic reproduction machine incorporating a magnetic development roller made in accordance with the present invention.

Figure 2:
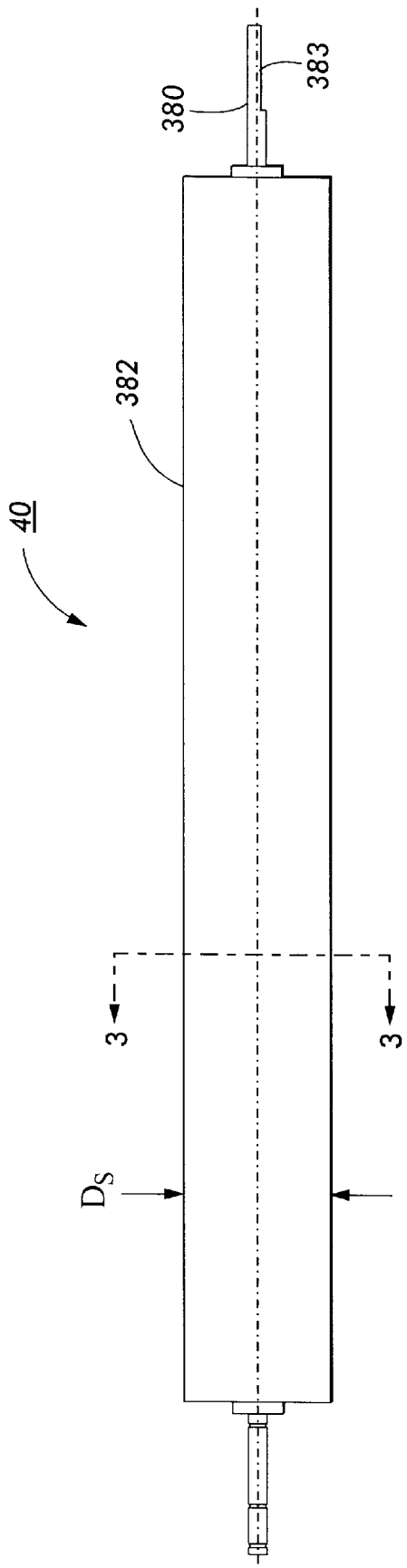
FIG. 2 is an elevational view of a magnetic development roller produced in accordance with the present invention.
Figure 3:
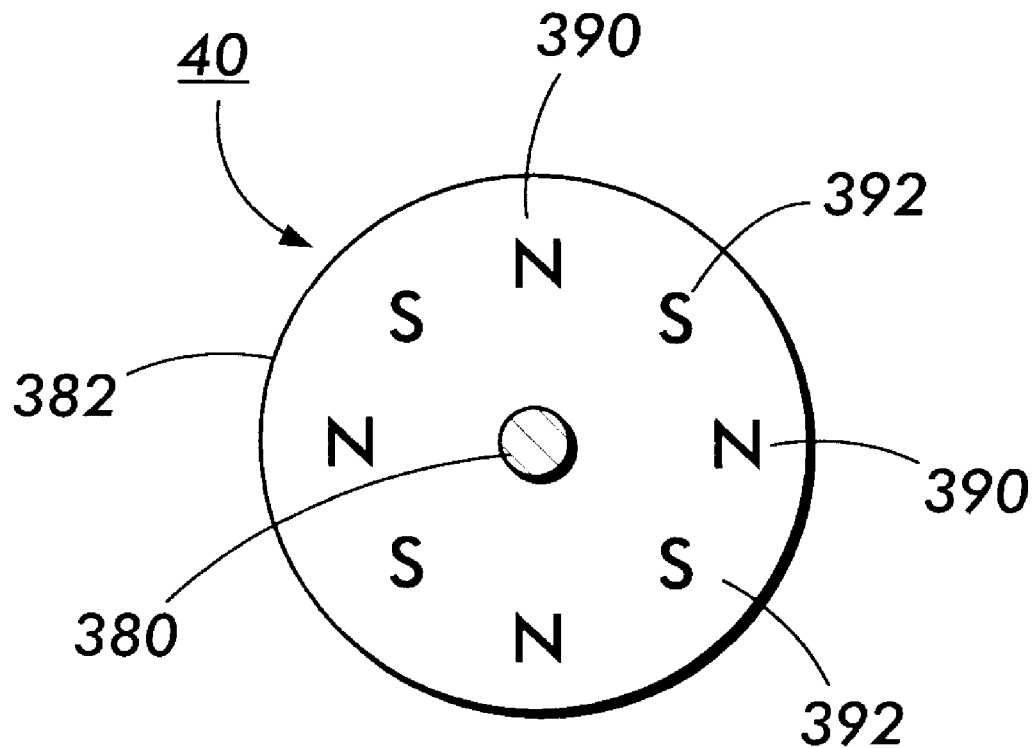
FIG. 3 is a sectional view along the line 3—3 in the direction of the arrows of the magnetic development roller of FIG. 2.

Referring now to FIGS. 2–5, the magnetic development roller 40 made in accordance with the present invention and including magnetic poles N and S each having a precise location and precise magnetic field strength is shown in more detail in FIGS. 2 and 3. As illustrated, the magnetic development roller 40 is generally cylindrical, and includes a core 382 having a diameter $D_s$ and positioned about a shaft 380. The core 382 may be made of any suitable, durable, moldable, or castable material. For example, the core material may be a polyester, a nylon, an acrylic, a urethane, or an epoxy. The core material may be made of any castable resin that is castable at low pressures. This core material may be fortified with fillers, for example, milled glass, glass fibers, conductive fillers, or reinforcements. Preferably, the core 382 includes ferrite or other material which is magnetizable. The shaft 380 is made of any suitable durable material capable of supporting the core 382. For example, the shaft may be made of a metal. To avoid having the shaft attracted to the permanent magnets and to the carrier granules, the metal is preferably a non-magnetic material such as SUS 303. The shaft 380 preferably includes a "D" flat section 383 which during molding of the roller 40 mates with a mating feature (not shown) on the molding assembly of the present invention. Furthermore the shaft maybe molded of the same material as the magnet core.

Referring now to FIGS. 2–3, while magnetic development rollers may be manufactured with a solitary magnetic development pole, N or S, preferably, the magnetic development roller 40 made in accordance with the present invention includes a plurality of magnetic development poles N and S. As particularly shown in FIG. 3, the magnetic development roller 40 includes four (4) spaced-apart north poles 390 separated by four (4) spaced-apart south poles 392. As stated earlier, the relative position and magnetic field strengths of each of the north poles 390 and the south poles 392 need to be may be precise in order to produce desired magnetic development results in the developer unit of the electrostatographic reproduction machine 10 of FIG. 1.

Figure 4:
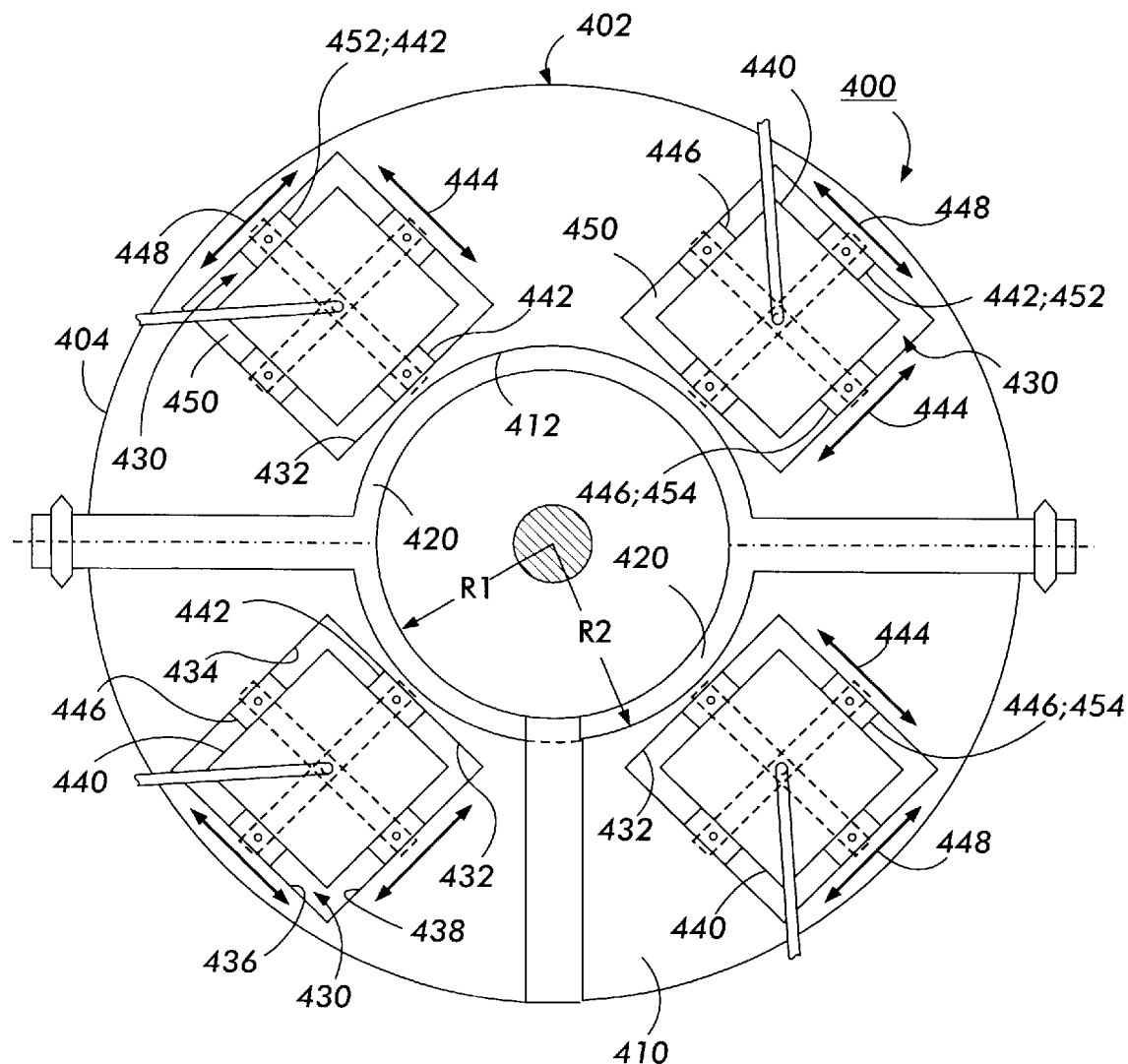
FIG. 4 is an end view of the molding assembly for making the magnetic development roller including permanent magnet position adjustment devices in accordance with the present invention.
Figure 5:
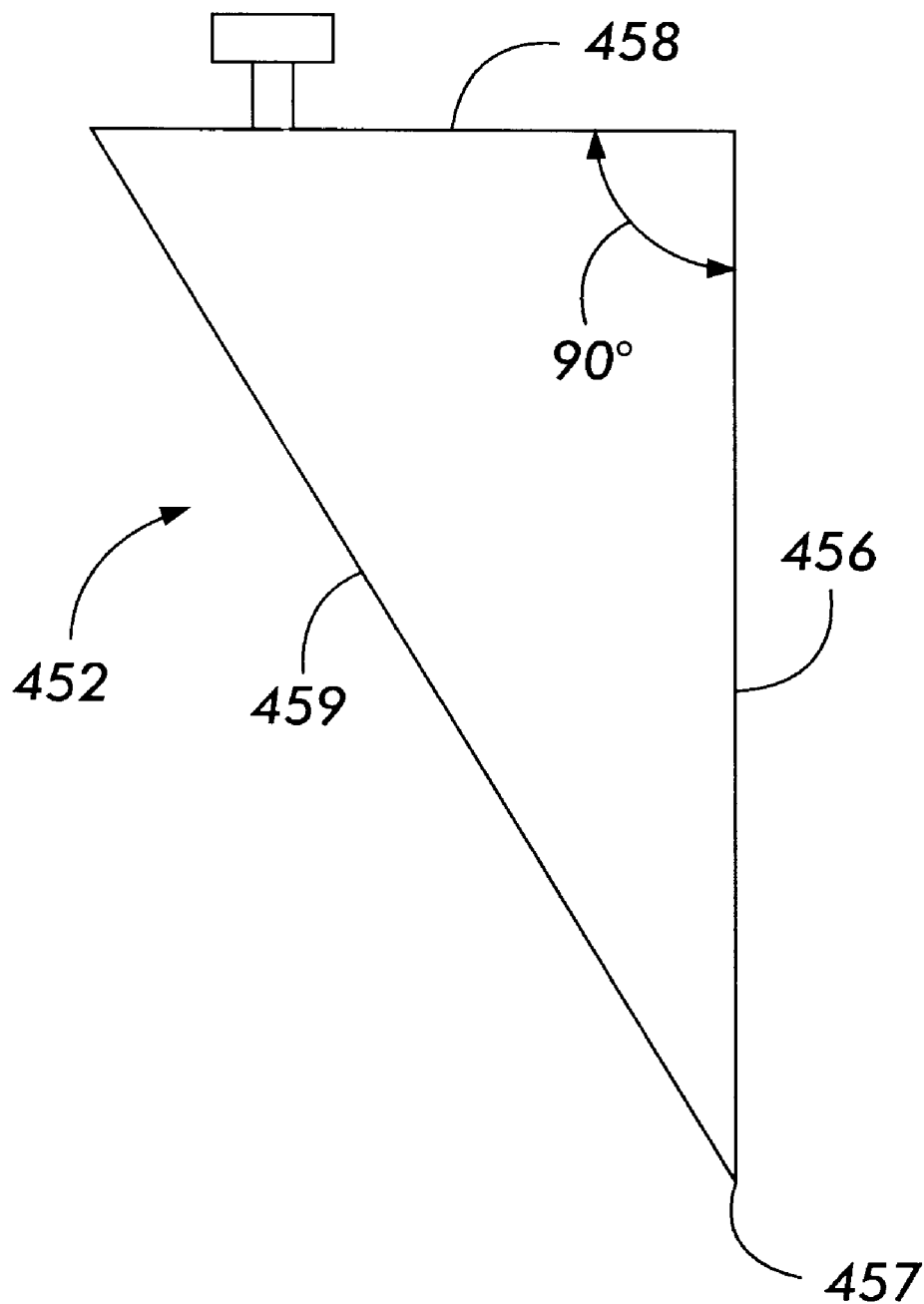
FIG. 5 is a schematic of a shim member of a permanent magnet position adjustment device of FIG. 4.

Referring now to FIGS. 4–5, a molding assembly 400 in accordance with the present invention is provided for producing the magnetic development roller 40 so that it includes magnetic poles having relatively precise locations and magnetic development fields for use in an electrostatographic reproduction machine for high quality image development. Only particular aspects of the molding assembly 400 related to the present invention will be described. Other aspects of a molding assembly similar to that 400 are described for example in U.S. application Ser. No. 08/752, 106 filed Nov. 20, 1996, and incorporated herein by reference. As shown, the molding assembly 400 includes a cylindrical member 402 having a first end 404 (shown in FIG. 4), a second end (not shown, but opposite and identical to the first end 404), a first radius R1, and a shell portion 410. The shell portion 410 includes an inner surface 412 defining a molding cavity 420 having a second radius R2 corresponding to an outer radius of a magnetic development roller such as 40, molded within the molding cavity.

The molding assembly 400 also includes a plurality of circumferentially spaced channels 430 that each formed within the shell portion 410 for containing a permanent magnet 440 suitable for inducing a magnetic field in a development magnetic roller being molded within the molding cavity 420. As shown, each channel 430 has generally parallel walls 432, 434, 436 and 438. The channels 430 essentially are identical, hence what is described about or labeled on one is the same for the others. Each channel 430 preferably has one of its walls, for example 432 located immediately adjacent the inner surface 412 of the shell portion 410, so as to place a permanent magnetic contained within the channel as close as possible to molding cavity. The permanent magnet 440 is positioned within each the channel 430, at a position that is accurate to plus or minus one to three degrees as determined initially by computer modeling, for example. The permanent magnet 440, as placed in each channel, defines an adjustment space 450, for itself, with each wall of the parallel walls 432, 434, 436 and 438.

Importantly, the molding assembly 400 includes an adjustment device for further adjusting the location of the permanent magnet 440 into a precise magnetizing position therefor within the adjustment space 450. The precise magnetizing position for the permanent magnetic is that position that will induce in a development roller being molded, magnetic poles having precise locations and precise field strengths. The adjustment device 400 further including at least one pair of first members 442 for adjustably moving the permanent magnet 440 radially, as shown by the arrow 444, relative to the center of the molding cavity 420. It also includes at least one pair of second members 446 for translating the permanent magnet 440, as shown by the arrow 448, non-radially relative to the center of the molding cavity 420, thus enabling efficient adjustment of the magnetizing position of the permanent magnet 440 for inducing relatively precise magnetic development fields in a magnetic development roller being molded within the molding cavity.

Still referring to FIGS. 4–5, the at least one pair of first members 442 preferably comprises a pair of varying size shim members 452 that are each located spaced from each other in a radial direction 444, relative to the molding cavity 420, and on opposite sides of the permanent magnet 440, so as to have opposite displacement effects the magnet when contacting the permanent magnet, and being moved axially into, or out of the adjustment space within the channel 430. Similarly, the at least one pair of second members 446 for translating the permanent magnet 440, comprises a pair of varying size shim members 454 located spaced from each other circumferentially, or in a non-radial direction as shown by the arrow 448, relative to the center of the molding cavity 420.

As illustrated in FIG. 5, the wedge shaped shim member 452, 454, for example 452, includes a vertical surface 456 that forms a 90° as shown with a top surface 458, and ends at a distal tip 457. When inserted into the adjustment space—within each channel 430 with its distal tip first, the vertical surface 456 faces and contacts a wall of the channel 430. The shim member 452, 454, for example 452, also includes a slanted surface 459 that faces and contacts the permanent magnet 440 when inserted into the adjustment space 450 for moving and adjusting the magnetizing position of the permanent magnet 440. As such, causing the distal tip 457 of the shim member 452 to move axially and deeper into the channel 430 moves the permanent magnet 440 away from the channel wall that is in contact with the vertical surface 456 of the shim member 452. On the other hand, causing the distal tip 457 to move outwardly as if being withdrawn from the channel 430, has the opposite effect, it moves the permanent magnet towards the channel wall that is in contact with the vertical surface 456. In this manner, the precise and desired position, either radial or circumferential, of the permanent magnet can be achieved by such adjustment within each channel 430.

Although only a first end 404 of the molding assembly 400 is shown in FIG. 4, it is understood as explained that its second is opposite and identical to the first end 404. Accordingly, the molding assembly 400 thus includes a pair of first members 442 at each of the first end and the second end for adjustably moving the permanent magnet 440 radially relative to the center of the molding cavity, thereby radially adjusting the magnetizing position of the permanent magnet. It thus also includes a pair of second members 446 at each of the first end and the second end for translating the permanent magnet 440 in a nearly circumferential direction, that is non-radially, relative to the center of the molding cavity. As illustrated in FIG. 5, each shim member 452 of the pair of first members 442, as well as each shim member 454 of the pair of second members 446 has a wedge shape.

The molding assembly 400 further includes a first toggling device 500 connected to each shim member 452 of the pair of first members 442 for enabling simultaneous, and semi-automatic movement of one and the other of the shim members 452, connected thereto, into and out of the adjustment space in opposite directions, and thus axially relative to the molding cavity. Similarly as shown, the molding assembly 400 also includes a second toggling device connected to each shim member 454 of the pair of second members 446 for enabling simultaneous, and semi-automatic movement of one and the other of the shim members 454, connected thereto, into and out of the adjustment space in opposite directions, and thus axially relative to the molding cavity 420.

It has been found that magnetic development rollers molded in accordance with the molding assembly of the present invention included magnetic poles having locations and magnetic fields that resulted in magnetic development field lines that were shown negligible distortion.

In operation, a resin, highly filled with ferrites or other ferromagnetic development powder for example is injected into the molding cavity 420. The permanent magnets 440 placed and adjusted into a precise magnetizing position, each induce a magnetic pole in the roller being formed from the resin. The position and strength of the induced poles in the roller being molded are critical and are determined by the remnance and position of the permanent magnets. As discussed earlier, the initial position of the permanent magnet 440 in each channel 430 is determined through magnetic computer modeling, to an accuracy of within 1°–3°. A more precise position is then achieved by the adjustment device of the molding assembly 400, thus fine tuning the locations of the poles on the molded roller. As disclosed above, spacers or shim members 452, 454 can be used, and translational movement (shown by the arrow 448) rather than rotational movement can be used when moving the shim members 454 to adjust the permanent magnets 440 in the circumferential direction, relative to the center of the molding cavity 420. Such a translational movement and adjustment can be used because only small movements of within a range of one to three degrees (1°–3°) are needed for the adjustment. Because only such small movements are required, the rotational distance "s=rθ" represented by an arc length subtending the adjustment angle θ of 1°–3°, can be approximated by a translated straight line distance of "x=2rsin(θ/2); where "r" is the radius and θ is 1°–3°.

The advantages from using shim members for adjustment are that they are inexpensive and easy to use. It is neither difficult to machine them as wedges 452, 454, nor is a complicated mechanical adjustment system necessary for moving them. Another important advantage is that the permanent magnets can easily be moved in radial direction, as shown by the arrow 444, thus adjusting the strength of the magnetic pole induced in the molded roller.

While the present invention has been described with reference to a preferred embodiment, it will be appreciated from this teaching that within the spirit of the present invention, various alternative modifications, variations or improvements therein may be made by those skilled in the art.

What is claimed is:

1. A molding assembly for producing a magnetic development roller having relatively precise magnetic development fields for use in an electrostatographic reproduction machine to develop a latent image recorded on a photoconductive member of the machine, the molding assembly comprising:

(a) a cylindrical member having a first end, a second end, a first radius, and a shell portion, said shell portion including an outer surface, and an inner surface defining a molding cavity having a second radius corresponding to an outer radius of a magnetic development roller molded within said molding cavity;

(b) a plurality of circumferentially spaced channels formed within said shell portion, each channel of said plurality of channels having generally parallel walls and being located immediately adjacent said inner surface of said shell portion for containing a permanent magnet suitable for inducing a magnetic field in a magnetic development roller molded within said molding cavity;

(c) a permanent magnet placed within each said channel of said plurality of channels, and spaced from each wall of said parallel walls, said permanent magnet, as placed, defining an initial position and an adjustment space therefor with each wall of said parallel walls; and (d) an adjustment device for adjusting said initial position of said permanent magnet within said adjustment space to achieve a precise magnetizing position therefor, said adjustment device including at least one pair of first members for adjustably moving said permanent magnet radially relative to a center of said molding cavity, and at least one pair of second members for translating said permanent magnet non-radially relative to a center of said molding cavity, thus efficiently achieving a precise magnetizing position for said permanent magnet for inducing relatively precise magnetic development fields in a magnetic development roller molded within said molding cavity.

2. The molding assembly of claim 1, wherein said at least one pair of first members comprises a pair of varying size shim members located spaced from each other in a radial direction relative to said molding cavity, and on opposite sides of said permanent magnet.

3. The molding assembly of claim 1, wherein said at least one pair of second members comprises a pair of varying size shim members located spaced from each other in a non-radial direction relative to said molding cavity, and on opposite sides of said permanent magnet.

4. The molding assembly of claim 1, including a pair of first members at each said first end and said second end of said cylindrical member for adjustably moving said permanent magnet radially relative to a center of said molding cavity, thereby radially adjusting said magnetizing position of said permanent magnet.

5. The molding assembly of claim 1, including a pair of second members at each said first end and said second end of said cylindrical member for translating said permanent magnet non-radially relative to a center of said molding cavity, thus efficiently adjusting said magnetizing position of said permanent magnet circumferentially relative to a center of said molding cavity, for inducing relatively precise magnetic development fields in a magnetic development roller molded within said molding cavity.

6. The molding assembly of claim 2, wherein each shim member of said pair of first members has a wedge shape.

7. The molding assembly of claim 3, wherein each shim member of said pair of second members has a wedge shape.

8. The molding assembly of claim 6, including a first toggling member connected to each shim member of said pair of first members for simultaneously moving one and the other of said shim members, connected thereto, axially and in opposite directions relative to said molding cavity.

9. The molding assembly of claim 7, including a second toggling member connected to each shim member of said pair of second members for simultaneously moving one and the other of said shim members, connected thereto, axially and in opposite directions relative to said molding cavity.

* * * * *